US012724774B1

(12) United States Patent
Krishnakumar et al.

(10) Patent No.: US 12,724,774 B1
(45) Date of Patent: Sep. 1, 2026

(54) ASYNCHRONOUS QUERY PROCESSING UTILIZING A CIRCULAR BUFFER

(71) Applicant: Amazon Technologies, Inc., Seattle, WA (US)

(72) Inventors: Sukruth Krishnakumar, San Jose, CA (US); Corentin Lucas Debost, San Diego, CA (US); Jaemyung Kim, San Jose, CA (US); Evgeny Potemkin, Cambridge (GB); Siddalingaiah Eraiah, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/758,724

(22) Filed: Jun. 28, 2024

(51) Int. Cl.
*G06F 15/16* (2006.01)
*G06F 16/2453* (2019.01)

(52) U.S. Cl.
CPC .............................. *G06F 16/24542* (2019.01)

(58) Field of Classification Search
None
See application file for complete search history.

(56) References Cited

U.S. PATENT DOCUMENTS

| | | | | |
|---|---|---|---|---|
| 7,805,433 | B2 | 9/2010 | Dickerman et al. | |
| 8,930,347 | B2 | 1/2015 | Broll et al. | |
| 9,442,674 | B1 * | 9/2016 | Andre | G06F 3/0613 |
| 11,853,319 | B1 * | 12/2023 | Kim | G06F 16/2358 |
| 2007/0168323 | A1 | 7/2007 | Dickerman et al. | |
| 2010/0114970 | A1 * | 5/2010 | Marin | G06F 16/951 707/E17.014 |
| 2016/0342444 | A1 * | 11/2016 | Nanduri | G06F 9/526 |
| 2017/0004172 | A1 * | 1/2017 | Idei | G06F 16/217 |
| 2024/0320032 | A1 * | 9/2024 | Xu | G06F 9/542 |

* cited by examiner

*Primary Examiner* — Alex Gofman

(74) *Attorney, Agent, or Firm* — S. Scott Foster; Kowert, Hood, Munyon, Rankin & Goetzel, P.C.

(57) ABSTRACT

A query may be selected for asynchronous processing, between synchronous query processing and asynchronous query processing. Asynchronous processing may be performed by a query engine, a storage engine, and a circular buffer of the database. The query engine may send requests for records to the storage engine and process records from a readable portion of the circular buffer. The storage engine may obtain records from the database based on the received requests, and store records within a portion of the circular buffer locked to prevent the query engine from reading the portion of the circular buffer. A query result may be generated from the records ready from the circular buffer by the query engine.

20 Claims, 10 Drawing Sheets

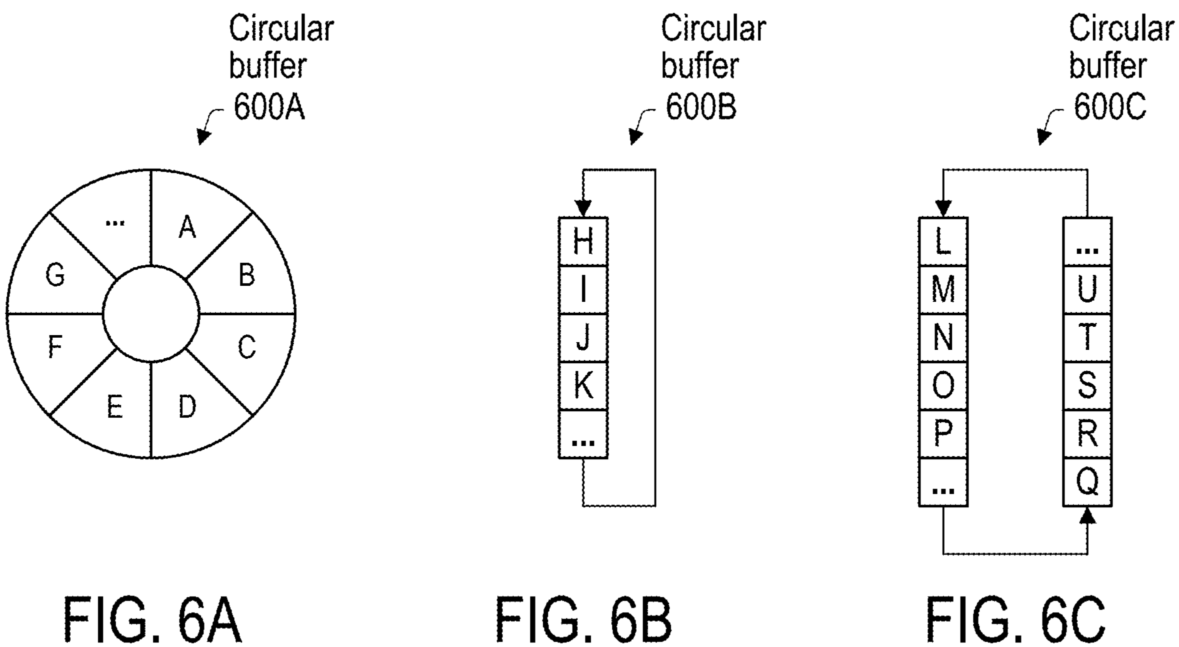
FIG. 6A
FIG. 6B
FIG. 6C
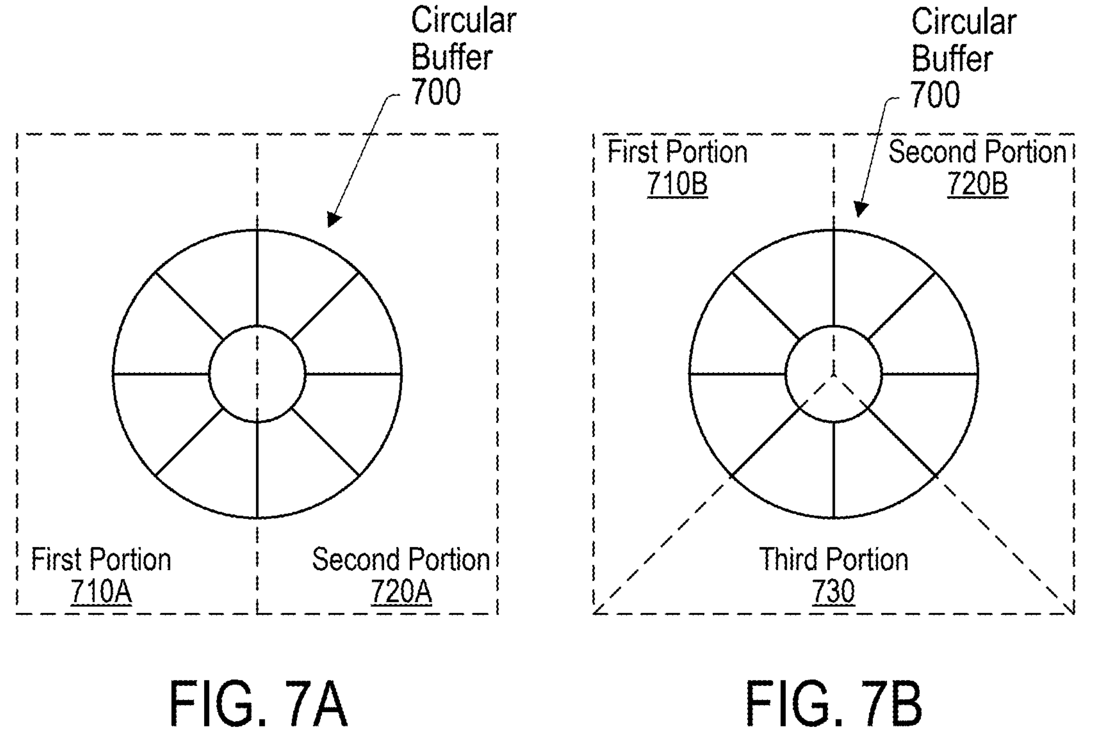
FIG. 7A
FIG. 7B

ASYNCHRONOUS QUERY PROCESSING UTILIZING A CIRCULAR BUFFER

BACKGROUND

Data storage systems often serve applications where access performance can have important impacts on the quality of work performed by the application. Many different factors can contribute to access performance on a database. Techniques that can improve access performance to data sets of data storage systems are thus highly desirable.

BRIEF DESCRIPTION OF THE DRAWINGS

FIGS. 6A-6C illustrate various different circular buffers which may be utilized for asynchronous query processing, by a database system, according to some embodiments.

FIGS. 7A-7B are block diagrams illustrating a circular buffer including multiple portions which may be utilized for asynchronous query processing, according to some embodiments.

Figure 1:
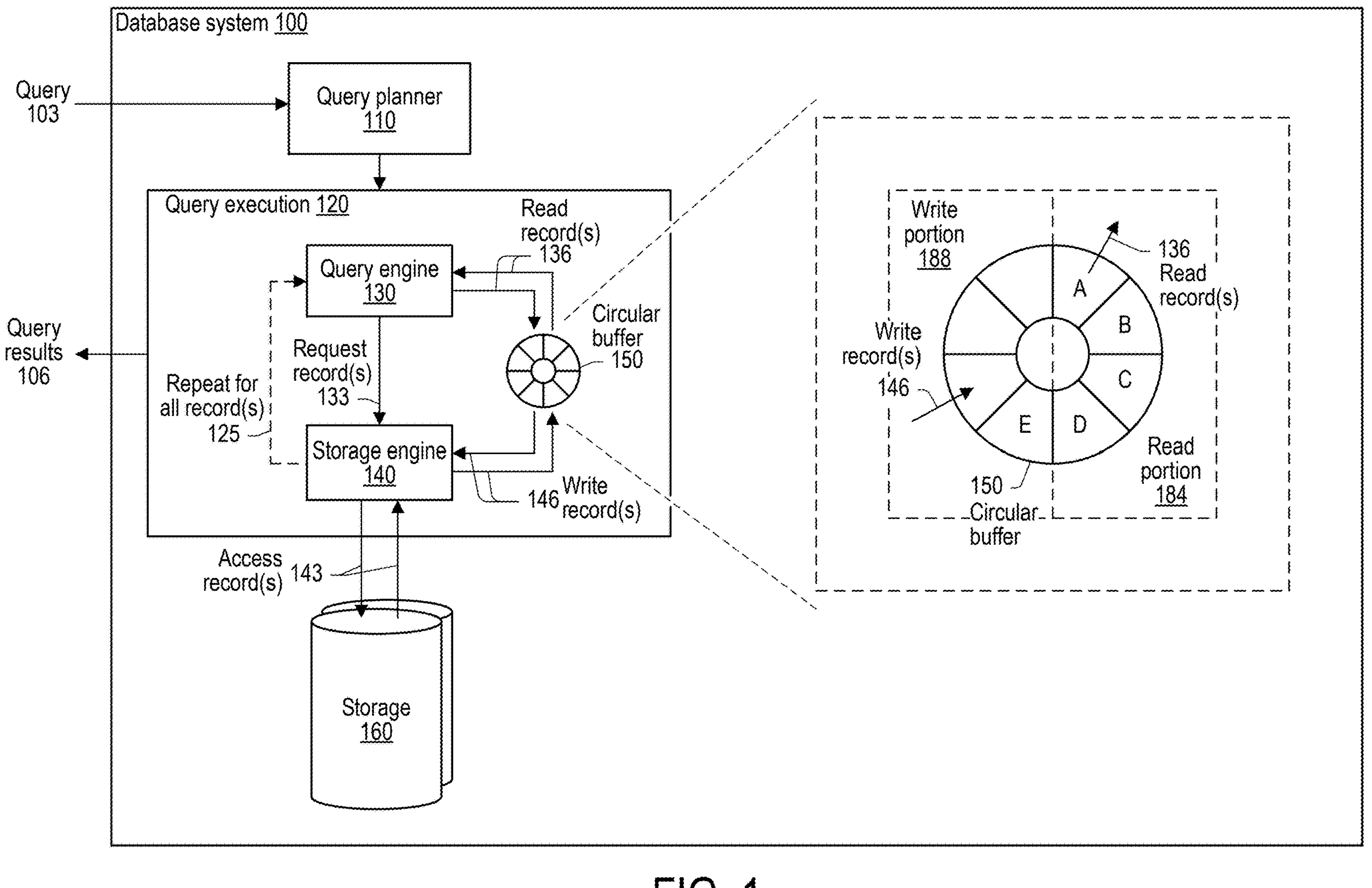
FIG. 1 is a logical block diagram illustrating a database system asynchronously processing a query with a circular buffer, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

The techniques described herein may describe asynchronous query processing utilizing a circular buffer for processing queries for a database, where the circular buffer may allow for asynchronously obtaining record(s) from a database, and processing obtained record(s) from the database to generate query results. Database client applications may need to collect query results from a database within a specified range of time, where the collection of query results may be critical for an operation or analysis of the client. Therefore, it should be appreciated by one of ordinary skill in the art that being able to asynchronously perform a query by utilizing a circular buffer which may allow the asynchronous collection of database record(s) and processing record(s) obtained for the database to generate the query results may improve query processing by reducing waiting times between obtaining record(s) and processing the record(s) to generate the query result, which improves the performance of computer systems generally (e.g., database client applications) and other database system related technologies (e.g., the database itself).

For example, asynchronous process may increase the speed at which client applications can analyze changes performed to items in a database, because queries that access a large number of records (e.g., analytics queries) may perform in a substantially shorter time than would otherwise occur if synchronous processing was used. Additionally, the techniques discussed below may provide performance improvements for other computer-related technologies which may benefit from or be constrained by query performance times in order to perform optimally.

FIG. 1 is a logical block diagram illustrating a database system that implements asynchronously processing a query with a circular buffer, according to some embodiments. A database system 100 may receive a query 103 to perform. Database system 100 may implement query planner 110 features to generate a plan to perform the query 103. Based on the generated plan to perform the query 103, query planner 110 may select asynchronous query processing for processing the query 103 (e.g., similar to selecting asynchronous query processing as discussed below with regard to FIG. 2 and in FIG. 8).

Query execution 120 may perform the query 103 utilizing asynchronous query processing. To perform asynchronous query processing, a query engine 130 may send requests for record(s) 133 to a storage engine 140, identify readable portions of a circular buffer 150 readable by the query engine 130, read record(s) 136 from the identified portions of the circular buffer 150, and generate the query results 160 from the processed record(s). The storage engine 140 may receive requests for record(s) 133, access record(s) from storage 160 based on the received requests for record(s) 133, identify at least one portion of the circular buffer 150 writeable by the storage engine 140, and write the accessed record(s) 146 to the identified at least one portion of the circular buffer 150. The query engine 130 and the storage engine 140 may perform their respective functions independently, at simultaneous or overlapping time periods.

In some embodiments, the asynchronous query processing for processing the query 103 may be repeated for as many records needed for processing the query 103, as indicated by repeat for all record(s) 125. As discussed in detail above, allowing for the query engine 130 to asynchronously read record(s) 136 from the read portion 184 of the circular buffer 150 while the storage engine 140 is writing record(s) 146 to the write portion 188 of the circular buffer, may improve the performance of processing the query 103 by reducing, or eliminating, waiting times for the query engine 130 and the storage engine 140 while the other one is respectively processing record(s) or accessing record(s) 143 from the storage 160 (e.g., storage service 450 of FIG. 4, etc.).

Asynchronous query processing may be selected for query 103 based at least on an analysis of the query plan to perform the query 103 and/or an analysis of the database system 100, and as discussed in detail below with regard to FIG. 2. Synchronous query processing may be selected for other queries received at database system 103, based on the analysis of the query plan to perform the query 103 and/or the analysis of the database system 100, and as discussed in detail below with regard to FIG. 8.

According to some embodiments, the database system 100 may be a database system implemented by a provider network as discussed in detail below with regard to FIG. 3. The database system 100 may be a database service (e.g., database service(s) 310 of FIG. 3) and a storage service (e.g., storage service(s) 320 of FIG. 3). The database service may implement the query engine 130 (e.g., database engine head node 410 implementing query engine 420 in FIG. 4, etc.), the storage engine 140 (e.g., database head engine node 410 implementing the storage service engine 430 in FIG. 4, etc.), and the circular buffer 150 (e.g., circular buffer 150 may be implemented by database service(s) 310 of FIG. 3, and database engine head node 410 of FIG. 4, etc.). The storage service may implement the storage 160 (e.g., storage service 450 of FIG. 4, etc.). In some embodiments, database system 100 may be a standalone database system, hosted on private or public computing systems or resources.

In at least some embodiments, query engine 130 (and query planner 110) may be implemented as part of a database management system application that handles client requests to create, update, delete, or otherwise manage or provide access to a database. In some embodiments, one or more threads may be used to implement query engine 130 (e.g., one or more execution threads to perform request records, read records, and process obtained records to execute a query). In various embodiments, a thread may be a thread of execution that execute instructions, which can be managed independently by a scheduler. Multiple threads may be implemented as part of a larger collection of operations to implement an application, which may be referred to as a process, in some embodiments. In some embodiments, multiple threads in a single process may allow for concurrent execution (e.g., each thread may execute to perform different operations), but may share common resources such as a processor or memory and/or state information.

In at least some embodiments, storage engine 140 may provide access to storage 160. Storage engine 140 may understand and interpret the underlying storage format of database data stored in storage 160 (e.g., understand the file format of records) in storage 160 and return the request records in a format that query engine 130 can understand. Storage engine 140 may support operations to read, write, update, create, or otherwise modify database data. In some embodiments, storage engine 140 may be implemented as one or more threads to perform various operations.

The circular buffer 150 may include at least two or more portions (e.g., the write portion 188 and the read portion 184 of FIG. 1, etc.) where individual ones of the at least two portions may have records written to, and records read from the individual ones of the at least two portions (e.g., write record(s) 146 and read record(s) 136), according to some embodiments. The circular buffer 150 may include at least two portions such that, the query engine 130 may be reading records 136 from a first portion of the at least two portions simultaneously to the query engine 140 writing records to a second portion of the at least two portions, such that, the query 103 may be performed asynchronously utilizing the at least two portions of the circular buffer 150. As one of normal skill in the art will appreciate, the circular buffer 150 may include more portions than the two portions discussed above (e.g., circular buffer 700B of FIG. 7B, etc.). In some embodiments, it may be beneficial for the circular buffer 150 to include more than two portions to eliminate further waits for the query engine 130 and the storage engine 140 while the other one of the query engine 130 and the storage engine 140 is still reading records 136 or writing records 146, respectively, to respective portions of the circular buffer. For example, the storage engine 140 may finish writing record(s) 146 to a second portion of the circular buffer 150 while the query engine 130 may still be reading record(s) 136 from a first portion of the circular buffer 150. The circular buffer 150 containing more portions than two may allow the storage engine 140 to proceed to write record(s) 146 to a third portion of the circular buffer 150 while the query engine 130 may still be reading the record(s) 136 from the first portion of the circular buffer 150. Similarly may be for the query engine 130 for reading record(s) from a third portion of the circular buffer 150, after finishing reading record(s) 136 from a second portion of the circular buffer 150 while the storage engine 140 may still be writing record(s) to a first portion of the circular buffer 150.

According to some embodiments, individual ones of the portions of the circular buffer may be locked or unlocked. The holder of a lock, such as storage engine 140, may exclude other threads or processes of execution (e.g., query engine 130) from accessing (e.g., reading or writing) the locked portion. In this way, the holder of the lock may have exclusive access to the locked portion of the circular buffer. Locks can be implemented in various ways. In one example, locks may be implemented by specifying or otherwise associating each portion of a circular buffer with permissions, where the permissions may be accessed by the query engine 130 and the storage engine 140 to respectively determine if the permission is a reading permission or writing permission. For example, the storage engine 140 may identify a writing permission to then identify a portion of the circular buffer where the storage engine 140 may write accessed record(s) 143 to the identified writeable portion. Similarly, the query engine 130 may identify a readable permission to then identify a readable portion of the circular buffer 150 where the query engine 130 may then read the records from the identified readable portion. In various embodiments, the query engine 130 and the storage engine 140 may modify permissions associated with the circular buffer 150 after respectively reading records and writing records to individual ones of the portions of the circular buffer. For example, the query engine 130 may read record(s) 136 from a first portion of the circular buffer where prior to reading the record(s) 136 from the first portion, the first portion was associated with a reading permission. After reading the record(s) 136 from the first portion, the query engine 130 may then associate the first portion with a writing permission. The storage engine 140 may then identify the first portion by identifying the writing permission associated with the first portion, and the storage engine 140 may then write accessed record(s) 143 to the first portion of the circular buffer 150.

In other embodiments, locks may be obtained or released by writing to specific storage locations in metadata (or in the buffer itself) that can identify whether, or not, a corresponding portion of the circular buffer is locked (e.g., a storage engine can write to a field, parameter, or other location to indicate that the portion is locked, which would allow another process or thread, such as query engine 130, to read the filed, parameter, or other location and determine that the portion of the circular buffer is locked and cannot be accessed).

The circular buffer 150 may include a single individual buffer where an end of the single buffer connects to a start of the single buffer, forming a seamless circle and the circular buffer 150 (e.g., circular buffer 600B of FIG. 6B, etc.), according to some embodiments. In other embodiments, the circular buffer 150 may include multiple individual buffers, where, similarly to the single individual buffer forming the seamless circle, individual ones of the individual buffers may connect to other ones of the individual ones of the individual buffers, forming the circular buffer 150 (e.g., circular buffer 600C of FIG. 6C, etc.).

According to some embodiments, a number of portions of the circular buffer 150 may be assigned dynamically. For example, based on one or more metrics for processing asynchronous query processing (e.g., metrics collected by the database service(s) 310 as discussed in detail below with regard to FIG. 3, etc.), and based on the one or more metrics, a number of portions may be assigned to the circular buffer 150 such that the query engine 130 and the storage engine 140 may continuously process the query 103 asynchronously without stopping. In other embodiments, a number of record(s) that may be written to a portion of the circular buffer 150 may be assigned dynamically. Based on metrics for performing asynchronous query processing, a number of record(s) that may be stored within the portions may be dynamically determined (e.g., to optimize database service 100 resources when an asynchronous query processing is not occupying as many resources, or to avoid delays in asynchronous query processing by limiting a number of record(s) that may be written and read from portions of the circular buffer 150).

According to some embodiments, two or more storage engines 140 (or two or more threads executing in parallel as part of a storage engine 140) may be utilized for query execution 120 to perform the query 103 utilizing asynchronous query processing. As discussed above, and below in detail, the query engine 130, to process the query 103 asynchronously, may send request for record(s) 133 to the two or more storage engines 140 (e.g., the query engine 130 may send a number of request for record(s) 133 to the two or more storage engines 140 based on a number of the two or more storage engines and/or a number of record(s) required to process the query 103, etc.). The two or more storage engines 140 may proceed to obtain record(s) from the storage 160, based on respective requests received from the request for record(s) 133 (e.g., as discussed above in detail with regard to the storage engine 140 accessing record(s) 143, etc.), and write the record(s) 146 to respective identified portions of the circular buffer 150 available for writing by each respective one of the two or more storage engines 140. The query engine 130 may identify a portion of the circular buffer 150 available for reading by the query engine 130 (e.g., read portion 184 as discussed above in detail), process the records from the identified portion, and proceed to identify a different portion of the circular buffer 150 available for reading by the query engine 130. As one of normal skill in the art will appreciate, processing asynchronously a query 103 utilizing two or more storage engines 140 may improve a time required to process the query 103, based on record(s) required to process the query 103, by allowing the query engine 130 to continuously identify and process record(s) from readable portions of the circular buffer 150, where the continuous, asynchronous work of the two or more query engines 140 allows for portions of the circular buffer 150 to continuously be available for reading for the query engine 130 (e.g., two or more storage engines 140 may allow for the query engine to always have a portion of the circular buffer available for reading, etc.).

Figure 2:
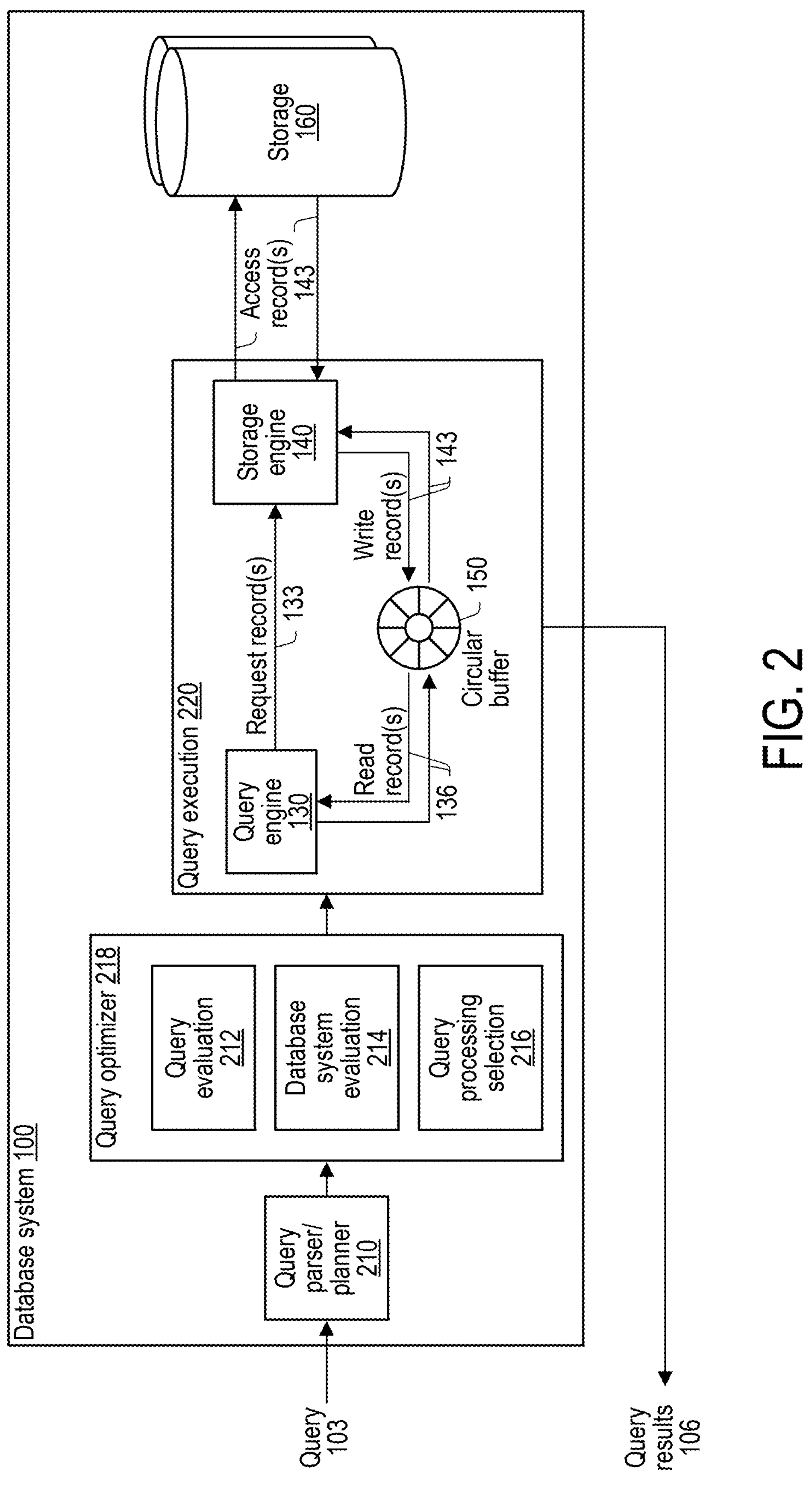
FIG. 2 is a logical block diagram illustrating a selection of asynchronous query processing utilizing a circular buffer for processing a query, according to some embodiments.

FIG. 2 is a logical block diagram illustrating a selection of asynchronous query processing utilizing a circular buffer for processing a query, according to some embodiments. FIG. 2 shows database system 100 receiving a query 103, and performing asynchronous query processing at query processing 210 to perform the query 103 (e.g., similar to the database system 100 performing asynchronous query processing as discussed above in FIG. 1, etc.), and return the query results 206. The database system 100 of FIG. 2 illustrates a separate query optimizer 218 from query parser/planner 210 which may perform the analysis to select synchronous or asynchronous processing for query 103. The query parser/planner 210 may receive the query 103 directed to the database system 100 and generate a plan to perform the query 103. For example, the query 103 may be parsed (e.g., using syntactical correctness based on a query language supported the database system 100) and transformed into a normalized form, such as an abstract symbol tree. Respective operations to execute the query may be identified and combined with the normalized from to generate a plan to perform the query, a query plan.

Query planner 210 and query optimizer 218 may be implemented by the query engine 130, according to some embodiments. The query engine 130 may be implemented by a database engine head node of a service of the database system 100 (e.g., database engine head node 410 of database service 310 of FIG. 4, etc.). The storage engine 140 and the circular buffer 150 may also be implemented by the database engine head node, where the circular buffer 150 may be accessible to both, the query engine 130 and the storage engine 140. Storage 140 may be implemented by storage node(s) of the database system 100 (e.g., storage node(s) 460 of FIG. 4, etc.).

Query optimizer 218 may receive the plan to perform the query 103, and apply one or more optimizations to improve query performance. Some optimizations may include modifying or changing the query plan (e.g., reorder operations, changing types of joins or other operations, or various other techniques to improve query performance). In some embodiments, query optimizer 218 may implement cost-based optimization which may determine different estimated costs for different versions of a query plan with different modifications and then select the lowest cost plan as the plan most likely to provide the best query performance.

In at least some embodiments, query processing selection 216, and query evaluation 212 and database system evaluation 214 may be implemented as part of query optimizer 218 in order to select the optimal processing style (e.g., asynchronous or synchronous) for a given query. Different aspects of a query itself and the database system may be considered when making a selection for style of processing for a query. For instance, query evaluation 212 may be implemented to evaluate the plan or other query specific information to perform the query 103 to inform the selection of query processing type. Similarly, database system evaluation 214 may evaluate the database system 100 overall to determine which style of processing is optimal based on the database system 100 (e.g., independent of query 103). Query processing selection 216 may use or apply various different criteria or weighting schemes to make a selection between synchronous and asynchronous processing styles for a given query, such as query 103, based on query evaluation 212 and database system evaluation 214, and select a processing for the query with query processing selection 216. Based on the selection (e.g., for asynchronous query processing as illustrated in FIG. 2), query execution 220 may process the query 103 utilizing asynchronous query processing with circular buffer 150 (e.g., similar to processing the query 103 with asynchronous query processing as discussed above with regard to FIG. 1, and as discussed below in detail with regard to processing query 510 with asynchronous query processing in FIG. 5, etc.).

As noted above, query evaluation 212 may analyze the plan or other query specific information to perform the query 103 for possible asynchronous processing, according to some embodiments. Query evaluation 212 may identify a query type (e.g., a read query or a write query, etc.) associated with the query 103. The query evaluation 212 may also evaluate specific information regarding the query 103, type of record(s) to be accessed for the query 103 (e.g., a query with a limit clauses, and/or queries directed to tables with externally stored fields, etc.), dependent subqueries associated with the query 103, and if there are multiple queries associated with the query 103. Based on the analysis from the query evaluation 212, the query processing selection 216 may select the optimal type of processing for the query 103. For example, in some embodiments, the query evaluation 212 may identify the query 103 as a read query and the query processing selection 216 may select asynchronous processing. In other embodiments, the query processing selection 216 may select synchronous processing for the query 103 based on identifying the query 103 as a write query (e.g., insert, delete and/or modify a record, etc.) and/or identifying dependent subqueries associated with the query 103 (e.g., subqueries which depend on a primary query read, etc.). In some embodiments, the query evaluation 212 may identify multiple queries associated with the query 103 (e.g., multiple, separate and individual queries, etc.), for which the query processing selection 216 may select an individual query of the multiple queries 103 to be processed utilizing asynchronous processing, and a rest of the multiple queries 103 may be selected for synchronous processing (e.g., query processing selection 216 may select the individual query for asynchronous processing based on the analysis performed for the different subqueries.

In some embodiments, the query evaluation 212 may estimate respective performance benefits for performing the query 103 with asynchronous or synchronous processing (e.g., an amount of time required to process the query 103 with asynchronous or synchronous processing) . . . . Query evaluation 212 may estimate the respective performance benefits for asynchronous and synchronous processing from specific information of the query 103, for example, a size of a scan for performing the query 103, a type of index used for performing the query 103, types of predicates used for performing the query 103 (e.g., select distinct, group by, order by, etc.), and/or a number of filters to utilize for performing the query 103. Query evaluation 212 may then compare the respective performance benefits and, based from the comparison, query processing selection 216 may select between asynchronous processing and synchronous processing at the optimal type of processing for the query 103. For example, query processing selection 216 may select asynchronous query processing when the performance benefit for asynchronous is greater than synchronous processing (e.g., processing the query 103 with asynchronous may be faster than utilizing synchronous processing, etc.). In other embodiments, an asynchronous performance threshold may be utilized with the comparison of the respective performance benefits by the query evaluation 212, where, in order to select asynchronous processing, the performance benefit for asynchronous processing may be greater than the performance benefit for synchronous processing, and the performance benefit for asynchronous processing may satisfy the asynchronous performance threshold.

In at least some embodiments, database system evaluation 214 may evaluate the database system 100 to determine if the database system 100 supports asynchronous processing (e.g., the database system 100 has available resources to perform asynchronous processing, etc.), according to some embodiments. In order for query processing selection 216 to select asynchronous processing for the query 103, database system evaluation 214 may identify at least an available thread to be utilized for asynchronous processing (e.g., an available thread which is not being utilized by a service of the database system 100, etc.). To identify the available thread, the database system evaluation 216 may identify a number of connections to the database system 100 (e.g., a number of user connections, etc.), and utilization of resources of the database system 100 (e.g., memory utilization and/or CPU utilization, etc.). Database system evaluation 100 may identify a number of available threads for utilizing for asynchronous processing, and the database system evaluation 100 may utilize the number of connections to the database system 100 to estimate an approximate use of the number of available threads (e.g., determining operations of the number of connections may utilize the threads for the individual operations, etc.). Based on identifying available threads and a number of connections to the database system 100 which will not utilize all the available threads (e.g., there is at least an available thread not being utilized), query processing selection 216 may select asynchronous processing for the query 103 (e.g., if query evaluation 212 also informs query processing selection 216 that asynchronous processing is the optimal processing for the query 103, etc.). In other embodiments, database system evaluation 214 may not identify an available thread to utilize for asynchronous processing, and, based on that, the query processing selection 216 may select the query 103 for synchronous processing.

The specification first describes an example of a provider network that may implement a database service and storage service, according to various embodiments. Included in the description of the example network-based services to process a query utilizing asynchronous query processing and a circular buffer. The specification then describes a flowchart of various embodiments of methods for processing a query utilizing asynchronous query processing and a circular buffer. Next, the specification describes an example system that may implement the disclosed techniques. Various examples are provided throughout the specification.

Figure 3:
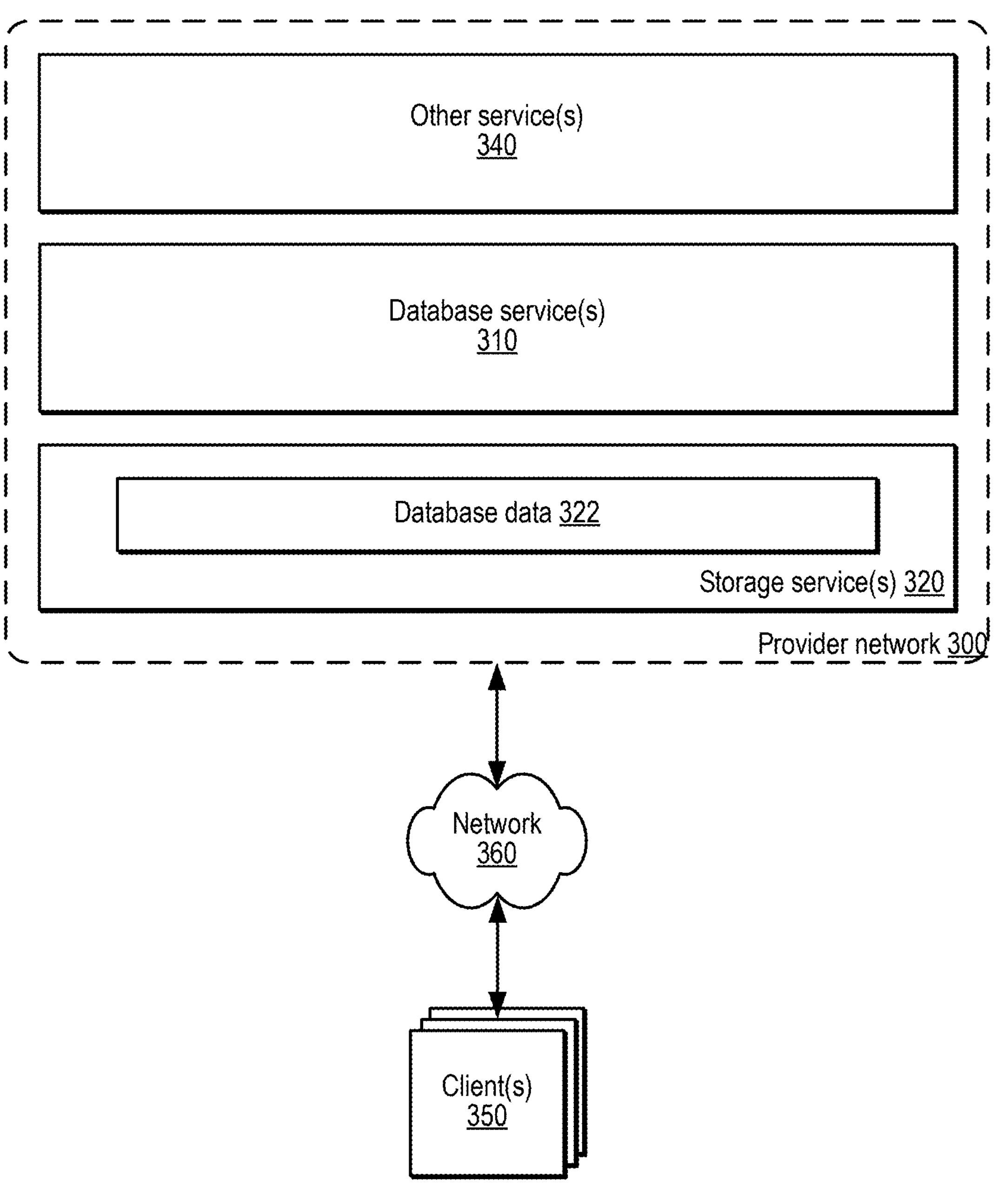
FIG. 3 is a logical block diagram illustrating a provider network that implements a database service and separate storage service process a query utilizing asynchronous query processing and a circular buffer according to some embodiments.

FIG. 3 is a logical block diagram illustrating a provider network that implements a database service and separate storage service process a query utilizing asynchronous query processing and a circular buffer according to some embodiments. Provider network 300 may be set up by an entity such as a company or a public sector organization to provide one or more services (such as various types of cloud-based computing or storage) accessible via the Internet and/or other networks to clients 350. Provider network 300 may include numerous data centers hosting various resource pools, such as collections of physical and/or virtualized computer servers, storage devices, networking equipment and the like (e.g., computing system 1100 described below with regard to FIG. 11), needed to implement and distribute the infrastructure and services offered by the provider network 300.

In some embodiments, provider network 300 may implement various network-based services, including database service(s) 310, a storage service(s) 320, and/or one or more other virtual computing services 340 (which may include various other types of storage, processing, analysis, communication, event handling, visualization, and security services). Database service(s) 310 may implement various types of database systems and formats (e.g., relational, non-relational, graph, document, time series, etc.) and the respective types of query engines to perform queries to those databases. Storage service(s) 320 may include many different types of data stores, including a log-structured storage service or other storage services as discussed below with regard to FIGS. 4 and 5, in some embodiments and may store database data 322.

Clients 350 may access these various services offered by provider network 300 via network 360. Likewise network-based services may themselves communicate and/or make use of one another to provide different services. For example, storage service 320 may store data 322 for databases managed by database service 310, in some embodiments. It is noted that where one or more instances of a given component may exist, reference to that component herein may be made in either the singular or the plural. However, usage of either form is not intended to preclude the other In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system embodiment illustrated in FIG. 11 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 350 may encompass any type of client configurable to submit network-based services requests to network-based services platform 300 via network 360, including requests for database services (e.g., a request to execute a transaction or query with respect to a database, a request to manage a database, such as a request to enable or disable performing queries across different types of query engines, etc.). For example, a given client 350 may include a suitable version of a web browser, or may include a plug-in module or other type of code module that can execute as an extension to or within an execution environment provided by a web browser. Alternatively, a client 350 (e.g., a database service client) may encompass an application, a web server, a media application, an office application or any other application that may make use of provider network 300 to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 350 may be an application that can interact directly with network-based services platform 300. In some embodiments, client 350 may generate network-based services requests according to a Representational State Transfer (REST)-style network-based services architecture, a document- or message-based network-based services architecture, or another suitable network-based services architecture. In some embodiments, a client of database service(s) 310 may be implemented within provider network 300 (e.g., on another service 340, such as virtual computing service).

In some embodiments, a client 350 (e.g., a database service client) may provide access to a database hosted in database service 310 to other applications in a manner that is transparent to those applications. For example, client 350 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to provider network 300 may be coordinated by client 350 and the operating system or file system on behalf of applications executing within the operating system environment.

Client(s) 350 may convey network-based services requests (e.g., a request to query a database or perform a transaction at a database) to and receive responses from services implemented as part of provider network 300 via network 360, in some embodiments. In various embodiments, network 360 may encompass any suitable combination of networking hardware and protocols necessary to establish network-based-based communications between clients 350 and provider network 300. For example, network 360 may generally encompass the various telecommunications networks and service providers that collectively implement the Internet. Network 360 may also include private networks such as local area networks (LANs) or wide area networks (WANs) as well as public or private wireless networks. For example, both a given client 350 and provider network 300 may be respectively provisioned within enterprises having their own internal networks. In such an embodiment, network 360 may include the hardware (e.g., modems, routers, switches, load balancers, proxy servers, etc.) and software (e.g., protocol stacks, accounting software, firewall/security software, etc.) necessary to establish a networking link between given client 350 and the Internet as well as between the Internet and provider network 300. It is noted that in some embodiments, clients 350 may communicate with provider network 300 using a private network rather than the public Internet. For example, clients 350 may be provisioned within the same enterprise as a database service system (e.g., a system that implements database service 310 and/or storage service 320). In such a case, clients 350 may communicate with provider network 300 entirely through a private network 360 (e.g., a LAN or WAN that may use Internet-based communication protocols but which is not publicly accessible).

Services within provider network 300 (or provider network 300 itself) may implement one or more service endpoints to receive and process network-based services requests, such as requests to access data pages (or records thereof), in various embodiments. For example, provider network 300 services may include hardware and/or software to implement a particular endpoint, such that an HTTP-based network-based services request directed to that endpoint is properly received and processed, in one embodiment. In one embodiment, provider network 300 services may be implemented as a server system to receive network-based services requests from clients 350 and to forward them to components of a system within database service 310, storage service 320 and/or another virtual computing service 340 for processing.

In some embodiments, provider network 300 (or the services of provider network 300 individually) may implement various user management features. For example, provider network 300 may coordinate the metering and accounting of user usage of network-based services, including storage resources, such as by tracking the identities of requesting clients 350, the number and/or frequency of client requests, the size of data tables (or records thereof) stored or retrieved on behalf of user, overall storage bandwidth used by users or clients 350, class of storage requested by users or clients 350, or any other measurable user or client usage parameter, in one embodiment. In one embodiment, provider network 300 may also implement financial accounting and billing systems, or may maintain a database of usage data that may be queried and processed by external systems for reporting and billing of client usage activity. In some embodiments, provider network 300 may be to collect, monitor and/or aggregate a variety of storage service system operational metrics, such as metrics reflecting the rates and types of requests received from clients 350, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 350 to enable such clients to monitor their usage of database service 310, and storage service 320.

In some embodiments, provider network 300 may also implement user authentication and access control procedures. For example, for a given network-based services request to access a particular database, provider network 300 may implement administrative or request processing components that may ascertain whether the client 350 associated with the request is authorized to access the particular database. Provider network 300 may determine such authorization by, for example, evaluating an identity, password or other credential against credentials associated with the particular database, or evaluating the requested access to the particular database against an access control list for the particular database. For example, if a client 350 does not have sufficient credentials to access the particular database, provider network 300 may reject the corresponding network-based services request, for example by returning a response to the requesting client 350 indicating an error condition, in one embodiment. Various access control policies may be stored as records or lists of access control information by database service 310, and storage service 320.

Figure 4:
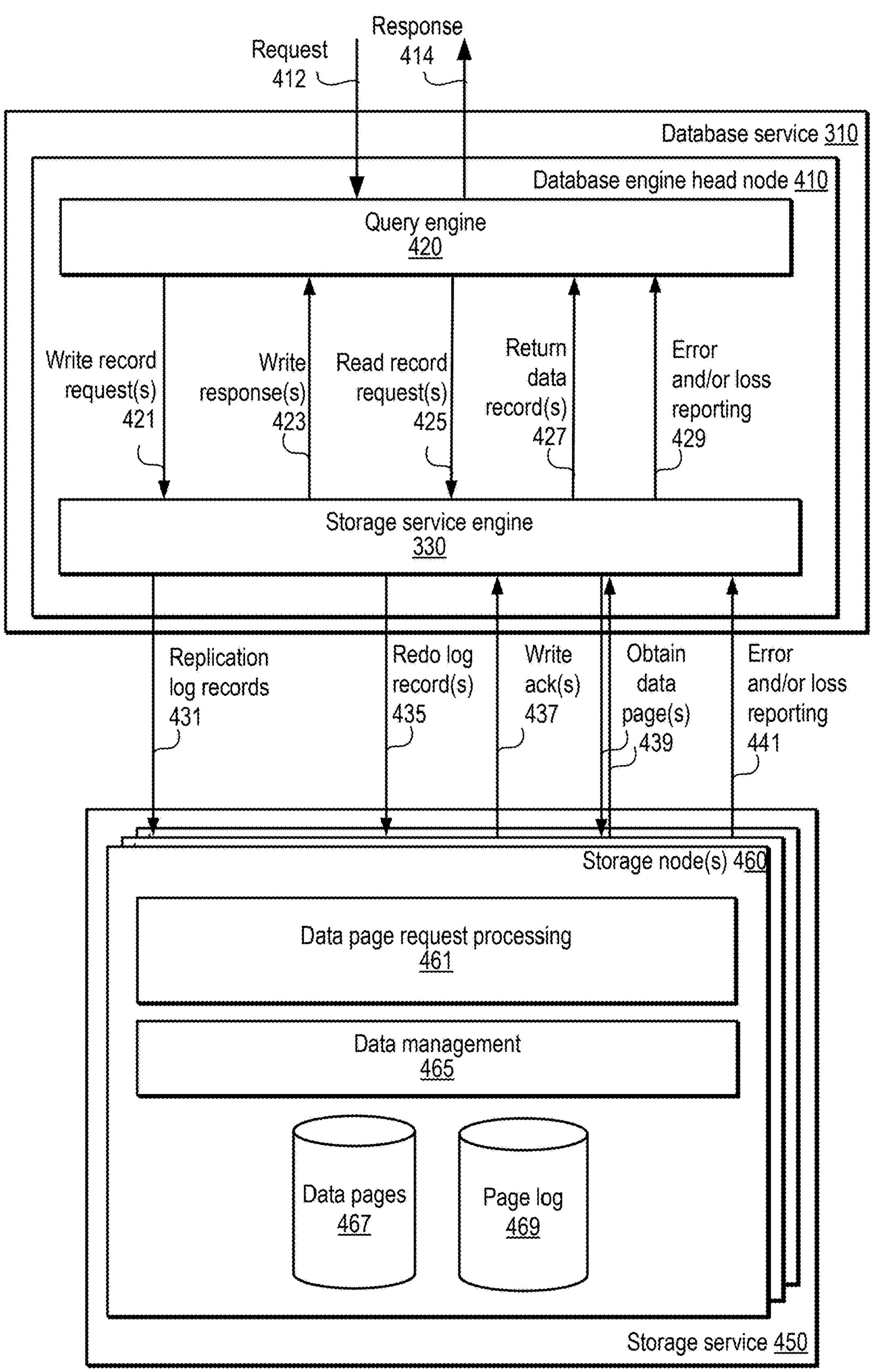
FIG. 4 is a logical block diagram illustrating various components of a database service and separate storage service, according to some embodiments.

FIG. 4 is a logical block diagram illustrating various components of a database service and separate storage service, according to some embodiments. Database service 410 may implement one or more different types of database systems with respective types of query engines for accessing database data as part of the database. In the example database system implemented as part of database service 410, a storage engine head node 410 may be implemented for each of several databases and storage service 450 (which may or may not be visible to the clients of the database system). Clients of a database may access a database head node 410 (which may be implemented in or representative of a database instance) via network utilizing various database access protocols (e.g., Java Database Connectivity (JDBC) or Open Database Connectivity (ODBC)). However, storage service 450, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, storage service 450 may perform various storage, access, change logging, recovery, log record manipulation, and/or space management operations in a manner that is invisible to clients of a storage engine head node 410.

As previously noted, a database instance may include a database engine head node 410 that implements a query engine 420 that receives requests, like request 412, which may include queries or other requests such as updates, deletions, etc., from various client programs (e.g., applications) and/or subscribers (users), then parses them, optimizes them, and develops a plan to carry out the associated database operation(s). Query engine 420 may return a response 414 to the request (e.g., results to a query) to a database client, which may include write acknowledgements, requested/queries database records or other items, error messages, and or other responses, as appropriate. As illustrated in this example, database engine head node 410 may also include a storage service engine 430 (or client-side driver), which may route read requests and/or redo log records to various storage nodes within storage service 450, receive write acknowledgements from storage service 450, receive requested data pages from storage service 450, and/or return data pages, error messages, or other responses to query engine 420 (which may, in turn, use them to generate a result to return to a database client).

In this example, query engine 420 or another database system management component implemented at database engine head node 410 (not illustrated) may manage a data page cache, in which data pages that were recently accessed may be temporarily held. Query engine 420 may be responsible for providing transactionality and consistency in the database instance of which storage engine head node 410 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database. Query engine 420 may manage an undo log to track the status of various transactions and roll back any locally cached results of transactions that do not commit.

FIG. 4 illustrates various interactions to perform various requests, like request 412. For example, a request 412 that includes a request to write to a page may be parsed and optimized to generate one or more write record requests 421, which may be sent to storage service engine 430 for subsequent routing to storage service 450. In this example, storage service engine 430 may generate one or more redo log records 435 corresponding to each write record request 421, and may send them to specific ones of the storage nodes 460 of storage service 450. Storage service 450 may return a corresponding write acknowledgement 437 for each redo log record 435 (or batch of redo log records) to database engine head node 410 (specifically to storage service engine 430). Storage service engine 430 may pass these write acknowledgements to query engine 420 (as write responses 423), which may then send corresponding responses (e.g., write acknowledgements) to one or more clients as a response 414.

In another example, a request that is a query may cause data pages to be read and returned to query engine 420 for evaluation and processing or a request to perform query processing at storage service 450 may be performed. For example, a query could cause one or more read record requests 425, which may be sent to storage service engine 430 for subsequent routing to storage service 450. In this example, storage service engine 430 may send these requests to specific ones of the storage nodes 460 of storage service 450, and storage service 450 may return the requested data pages 439 to database engine head node 410 (specifically to storage service engine 430). Storage service engine 430 may send the returned data pages to query engine 420 as return data records 427, and query engine may then evaluate the content of the data pages in order to determine or generate a result of a query sent as a response 414. As discussed below with regard to FIG. 4, some requests to store replication log records 431 may be performed as part of performing replication log techniques (e.g., to amortize the transmission of replication records to a replication log).

In some embodiments, various error and/or data loss messages 441 may be sent from storage service 450 to storage engine head node 410 (specifically to storage service engine 430). These messages may be passed from storage service engine 430 to query engine 420 as error and/or loss reporting messages 429, and then to one or more clients as a response 414.

In some embodiments, the APIs 431-441 of storage service 450 and the APIs 421-429 of storage service engine 430 may expose the functionality of the storage service 450 to database engine head node 410 as if storage engine head node 410 were a client of storage service 450. For example, storage engine head node 410 (through storage service engine 430) may write redo log records or request data pages through these APIs to perform (or facilitate the performance of) various operations of the database system implemented by the combination of storage engine head node 410 and storage service 450 (e.g., storage, access, change logging, recovery, and/or space management operations).

Note that in various embodiments, the API calls and responses between database engine head node 410 and storage service 450 (e.g., APIs 421-429) and/or the API calls and responses between storage service engine 430 and query engine 420 (e.g., APIs 431-441) in FIG. 4 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 410 and/or storage service 450.

In some embodiments, database data for a database of database service 410 may be organized in various logical volumes, segments, and pages for storage on one or more storage nodes 460 of storage service 450. For example, in some embodiments, each database may be represented by a logical volume, and each logical volume may be segmented over a collection of storage nodes 460. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 460 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 42768 bytes.

As discussed above, storage service 450 may perform some database system responsibilities, such as the updating of data pages for a database, and in some instances perform some query processing on data. As illustrated in FIG. 4, storage node(s) 460 may implement data page request processing 461, replication log processing 463, and data management 465 to implement various ones of these features with regard to the data pages 467 and page log 469 of redo log records among other database data in a database volume stored in storage service. For example, data management 465 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 461 may handle requests to return data pages of records from a database volume, and may perform operations to coalesce redo log records or otherwise generate a data pages to be returned responsive to a request. Replication log processing 463 may handle requests to store replication logs to transaction objects and update replication logs stored in or associated with logical replication log 471.

In at least some embodiments, storage nodes 460 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 5:
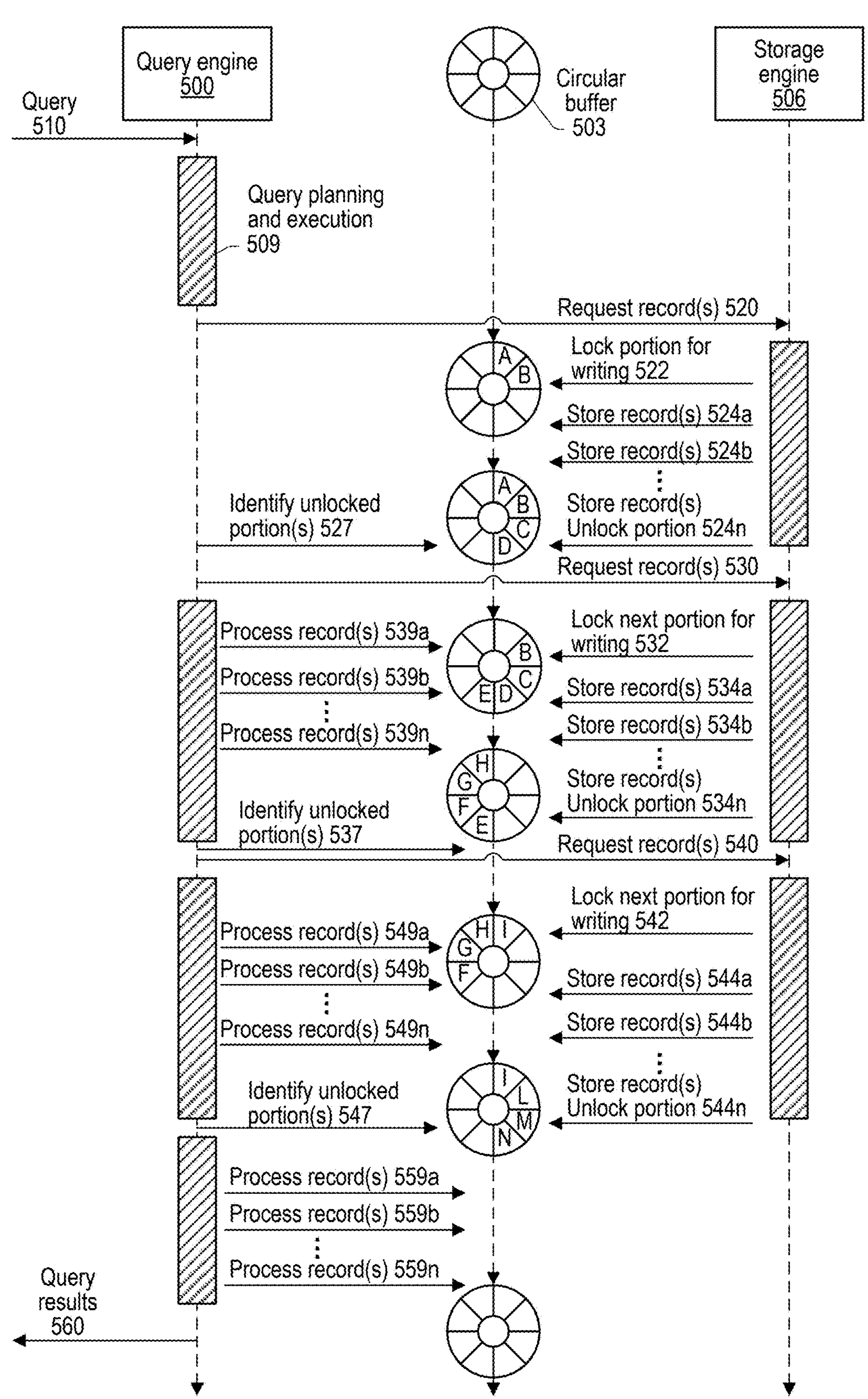
FIG. 5 is a logical block diagram illustrating a query engine and a storage engine utilizing a circular buffer to asynchronously perform a query, according to some embodiments.

FIG. 5 is a sequence diagram illustrating a query engine and a storage engine utilizing a circular buffer to asynchronously perform a query, according to some embodiments. FIG. 5 shows query engine 500 (e.g., query engine 130 of FIGS. 1-2, etc.), circular buffer 503 (e.g., circular buffer 150 of FIGS. 1-2, circular buffer 600 of FIGS. 6A-6C, circular buffer 700 of FIGS. 7A-7B, etc.) and storage engine 506 (e.g., storage engine 140 of FIGS. 1-2, etc.). The query engine 500 may receive a query 510 to be performed by the query engine 500, and query engine 500 may generate a plan to perform the query 510 and select asynchronous processing for the query 510 (e.g., selection of asynchronous query processing as discussed above with regard to FIG. 2, etc.) as indicated by query planning and execution 509.

According to some embodiments, after selecting asynchronous query processing for the query 103, the query engine 500 may send a first request to the storage engine 506 as indicated by request record ((s) 520. The storage engine 506 may receive the request for record(s) 520, and access one or more data stores to access the requested record(s) (e.g., access record(s) 143 as discussed above with regard to FIGS. 1-2, etc.). The storage engine 506 may then identify a writeable portion of circular buffer 503 (e.g., similar to the storage engine 140 identifying the write portion 188 of FIG. 1, etc.), and the storage engine 506 may proceed to lock the portion for writing, as indicated at 522, and write the accessed record(s) to the identified writeable portion as indicated by store record(s) 524*a*-524*n*. As indicated by 524*a*-524*n*, the storage engine 506 may write the record(s) to a portion of the circular buffer as indicated by the record(s) "A-D." According to the requested record(s) 520 received, the storage engine 506 may write a single record to the identified writeable portion 532, or may store multiple record(s), where an amount of record(s) to write may be determined from the plan to perform the query 103. Upon completion of storing the records, storage engine 506 may unlock the portion of circular buffer 503, as indicated at 524*n*.

In various embodiments, the query engine 500 may identify an unlocked portion of the circular buffer 503 as a portion readable by the query engine 500, as indicated at 527 (e.g., first portion may be identified by an associated reading permission as discussed above in detail with regard to FIG. 1, etc.). After identifying the first portion of the circular buffer 503 as unlocked 527, the query engine 500 may send a subsequent request for record(s) 530 to the query engine (although in some embodiments no further request for records may be sent), and proceed to read the record(s) from the identified first portion as indicated by process record(s) 539*a*-539*n*. As indicated by 539*a*-539*n*, the query engine 500 may be reading the record(s) from a portion of the circular buffer as indicated by the removal of the records "A-D." Simultaneously to the query engine 500 processing the record(s) from the first portion of the circular buffer 503, the storage engine 506 may receive the subsequent request for record ((s) 530, access the requested record(s) 530 from one or more databases (or continue to obtain further records from request for records 520), identify a subsequent portion of the circular buffer as writeable by the storage engine and lock the next portion for writing, as indicated at 532, and store the record(s) to the subsequent portion of the circular buffer 503 as indicated by store record(s) 534*a*-534*n*.

The techniques discussed above may be repeated for multiple iterations in order to obtain and process records using the circular buffer by query engine 500 and storage engine 506 performing asynchronous query processing. Although FIG. 5 illustrates two cycles of asynchronous query processing as illustrated by a first cycle from 527 to right before 537 and a second cycle from 537 to right before 547, more or less cycles of asynchronous query processing may be utilized for processing the query 510, based on record(s) required for processing the query 510.

According to some embodiments, after identifying a portion of the circular buffer 503 containing record(s) that are readable by the query engine 500, the query engine 500 may determine that no further record(s) are required for processing the query 510. For example, as illustrated by identify unlocked portion 547 and a lack of a subsequent request for record(s) after identifying the writeable portion(s) 547, the query engine 500 may determine that no further record(s) may be required to process the query 503, and as illustrated by process record(s) 559*a*-559*n*, the query engine 500 may finalize processing record(s) from the circular buffer 503, and based on the record(s) processed from the circular buffer 503, the query engine 500 may generate the query results 560.

In some embodiments, the query engine 500 may send a single request for records to the storage engine 506 (e.g., request record(s) 520, etc.) in order to perform the query 510 utilizing asynchronous query processing. For example, the query engine 500 may send the request record(s) 520, as illustrated in FIG. 5, the query engine may continue to identify one or more portions of the circular buffer 503 readable by the query engine 500 (e.g., identify unlocked portion(s) 527, 537, 547, etc.) and process record(s) from the identified one or more portions of the circular buffer 503, to process the query 510. The storage engine 506 may receive the single request for record(s) 520, and the storage engine 506 may proceed to obtain record(s) from a database (e.g., storage engine 160 of FIGS. 1 and 2, etc.), lock portions of the circular buffer 503 for writing 522, write the record(s) 524, unlock the portion of the circular buffer 503 as illustrated by unlock portion 524*n*, and repeat the above steps for as many records are requested by the single request record(s) 520. For example, in some embodiments, the storage engine 506 may receive a single request for record(s) 520, and in order to perform the query 510, the storage engine 506 may identify a single portion of the circular buffer 503, and store the obtained records within the identified single portion of the circular buffer 503 to be processed by the query engine 500 to perform the query 510. In other embodiments, the storage engine may receive a single request for record(s) 520 which may involve the storage engine 506 identifying multiple portions of the circular buffer 503, and store records within the multiple portions of the circular buffer 503 (e.g., the multiple cycles of asynchronous query processing discussed above in detail, etc.).

FIGS. 6A-6C are block diagrams illustrating various circular buffers which may be utilized for asynchronous query processing by a database system, according to some embodiments. FIG. 6A shows circular buffer 600A as an individual buffer. FIG. 6B shows circular buffer 600B, which may be one implementation of circular buffer 600A, an individual buffer having an end of the individual buffer connect to a beginning of the individual buffer, forming the circular buffer 600B as shown by an arrow in FIG. 6B (e.g., by writing to entries of an array and then looping back to the beginning of the array when the end of the array is reached). And FIG. 6C shows circular buffer 600C multiple individual buffers, where similarly to the circular buffer 600B of FIG. 6B, individual ones of the multiple individual buffers connect to other ones of the multiple individual buffers, forming the circular buffer 600C. The circular buffers described below in FIGS. 6A-6C, circular buffers 600A-C, may be utilized within the embodiments described above with regard to FIGS. 1-2 and 5, and similarly, the circular buffers 600A-C may be utilized within the embodiments described below with regard to FIGS. 7A-B and 8-10. The circular buffers 600A-C are described herein by way of example, and those skilled in the art will recognize that the embodiments are not limited to the embodiments or drawings of FIGS. 6A-C, and the drawings and description of FIGS. 6A-C are not intended to limit embodiment to the particular form disclosed, but on the contrary, the intention is to cover all modifications, equivalents and alternatives falling within the spirit and scope as described below.

According to some embodiments, the individual buffers referred to herein within this specification may be array constructs, where each array construct may include a start and an end, where a number of records that each individual array construct may store may define a length for each respective individual array. For example, as discussed above, FIG. 6B may include an array construct where a start of the array construct may connect to the end of the array construct to form the circular buffer 600B. In other embodiments, more than a single array construct may be utilized to form a circular buffer (e.g., circular buffer 600C as discussed below in detail, etc.). FIG. 6A, in some embodiments, may be an ideal illustration of what a circular buffer may comprise once one or more individual buffers form the circular buffer (e.g., circular buffer 600B may be circular buffer 600A, or circular buffer 600C may be circular buffer 600A, etc.).

The circular buffer 600B of FIG. 6B may include an individual buffer, where an end of the individual buffer connects to a beginning of the individual buffer, forming the circular buffer 600B, according to some embodiments. The circular buffer 600B may include multiple portions (e.g., similar to the portions of the circular buffer utilized for asynchronous query processing in FIGS. 1-2, 5, and 7-10, etc.), where the multiple portions may have records written to, and records read from the multiple portions. Connecting the end to the start of the circular buffer 600B allows to seamlessly transition through the portions of the circular buffer 600B when records are either being written to, or being read from.

FIG. 6C shows circular buffer 600C including multiple individual buffers, where individual ones of the multiple individual buffers connect to other ones of the multiple individual buffers, forming a circle with the multiple individual buffers, and forming the circular buffer 600C, according to some embodiments. For example, the circular buffer 600C may include at least a first individual buffer and a second individual buffer. The end of the first individual buffer may connect to a start of the second individual buffer, and the end of the second individual buffer may connect to a start of the first individual buffer, forming the circular buffer 600C. In other embodiments, the circular buffer 600C may include more than the first and second individual buffers described above.

FIGS. 7A-7B are block diagrams illustrating a circular buffer including multiple portions which may be utilized for asynchronous query processing, according to some embodiments. FIG. 7A shows circular buffer 700A including a first portion 710A and a second portion 720A (e.g., the first and subsequent portions of FIG. 1, the first and second portions of FIG. 5, etc.), and FIG. 7B shows circular buffer 700B including a first portion 710B, a second portion 720B, and a third portion 730. The portions of the circular buffers 700A-B described below with regard to FIGS. 7A and 7B may be utilized within the techniques discussed above with regard to FIGS. 1-2 and 5-6A-C for asynchronous query processing, as well the portions of the circular buffers 700A-B may be utilized within the techniques discussed below with regard to FIGS. 8-10 for asynchronous query processing.

Individual ones of the multiple portions of the circular buffers 700A-B may be utilized for asynchronous query processing, where the individual ones of the multiple portions may store records for the stored records to be processed, according to some embodiments. As discussed in detail above, a storage engine (e.g., storage engine 140 of FIGS. 1-2, and storage engine 506 of FIG. 5, etc.) may identify a first portion of the multiple portions to be a writeable portion. After determining the first portion as writeable, the storage engine may write the records to the first portion. The first portion may then be identified by a query engine (e.g., query engine 130 of FIGS. 1-2, query engine 500 of FIG. 5, etc.) as a readable portion, and the query engine may proceed to read the records from the first portion of the circular buffer (e.g., circular buffer 700A or circular buffer 700B, etc.).

In various embodiments, individual ones of multiple portions of circular buffers may be locked or unlocked (e.g., have a permission associated with the individual ones of the multiple portions, where the permission may indicate if the associated individual portion is readable or writeable by the query engine or the storage engine, respectively). Locks, such as permissions for individual ones of the portions may be stored within the circular buffer, where the permissions for individual ones of the portions, may be accessible by a query engine and a storage engine. The query engine may determine lock status for a portion (e.g., as described above in detail with regard to read record(s) 136 of FIG. 1, etc.) of a circular buffer, and based on the lock status, the query engine may determine the portion of the circular buffer is a readable portion. Similarly, the storage engine may access a lock for a portion of the circular buffer, and based on the lock's status, the storage engine may determine the portion of the circular buffer to be a writeable portion (e.g., as described above in detail with regard to write records 146 of FIG. 1, etc.).

Individual ones of the portions of the circular buffers 700A-B may be locked when records are being written or read from the respective individual ones of the portions, according to some embodiments. For example, a query engine may attempt to access a first portion 710 of a circular buffer 700 which records are being written to by a storage engine. The query engine may be locked from accessing the first portion 710 while the storage engine is writing records to the first portion 710 (e.g., the query engine may determine the first portion 710 is not readable by the query engine, and/or the query engine may identify a permission associated with the first portion 710 which does not indicate the first portion 710 to be readable, etc.). Similarly, the storage engine may be locked from writing records from the first portion 710 when the query engine is reading records from the first portion 710.

The circular buffer 700 may include multiple portions, as illustrated by FIGS. 7A and 7B, according to some embodiments. The portions of the circular buffer 700 may include a minimum of at least two portions, as illustrated by the first portion 710A and the second portion 720A of circular buffer 700A, such that a query engine may read records from either the first portion 710A or the second portion 720A while a storage engine is writing records to the other one of the first and second portions 710A and 720B, respectively. In other embodiments, the circular buffer 700 may include more than two portions as illustrated by FIG. 700B. In some embodiments, the circular buffer 700 may include more portions than the ones depicted in the embodiments of FIGS. 7A-B. The circular buffer 700 including more than two portions t may support multiple threads writing to different portions and/or multiple threads reading from different portions, in some embodiments. For example, the storage engine may finish writing records to the second portion 720B while the query engine is still reading records from the first portion 710B. Rather than waiting for the query engine to finish reading records from the first portion 710B, the storage engine may proceed to write records to the third portion 730 while the query engine may still be reading records from the first portion 710B. A similar scenario may occur for the query engine reading records from the second portion 720B while the storage engine is still writing records to the first portion 710B.

In various embodiments, individual ones of the portions of the circular buffer 700 may include equal sizes for storing records, where the size for storing records may be calculated from metrics of priorly performed asynchronous queries by a database system. The database system might store metrics regarding asynchronous queries performances for one or more queries received, and based on the stored metrics, the size for the individual portions of the circular buffer 700 may be determined. The size for the individual portions may be determined based on a size which allows a query engine to read records from portions and a storage engine to write records to portions with the least amount of waiting time in between reading to different portions for the query engine, and writing to different portions for the storage engine. In other embodiments, the size for individual ones of the portions of the circular buffer 700 may be determined by the database system. In other embodiments, the circular buffer 700 and portions of the circular buffer 700 may include sizes which are respectively dynamically managed, such that, the portions of the circular buffer 700 may be increased in size, or decreased in size, based on usage of the circular buffer 700 (e.g., usage may be determined based on read record(s) 136 and write record(s) 146, in some embodiments, etc.), as discussed above in detail with regard to FIG. 1.

The specification now continues with the description of the flowcharts for various embodiments of methods for processing the query utilizing asynchronous query processing and the circular buffer as described above. The embodiments of FIGS. 1-7 may be utilized in combination with the embodiments of the methods described below for processing the query utilizing asynchronous query processing and the circular buffer.

Figure 8:
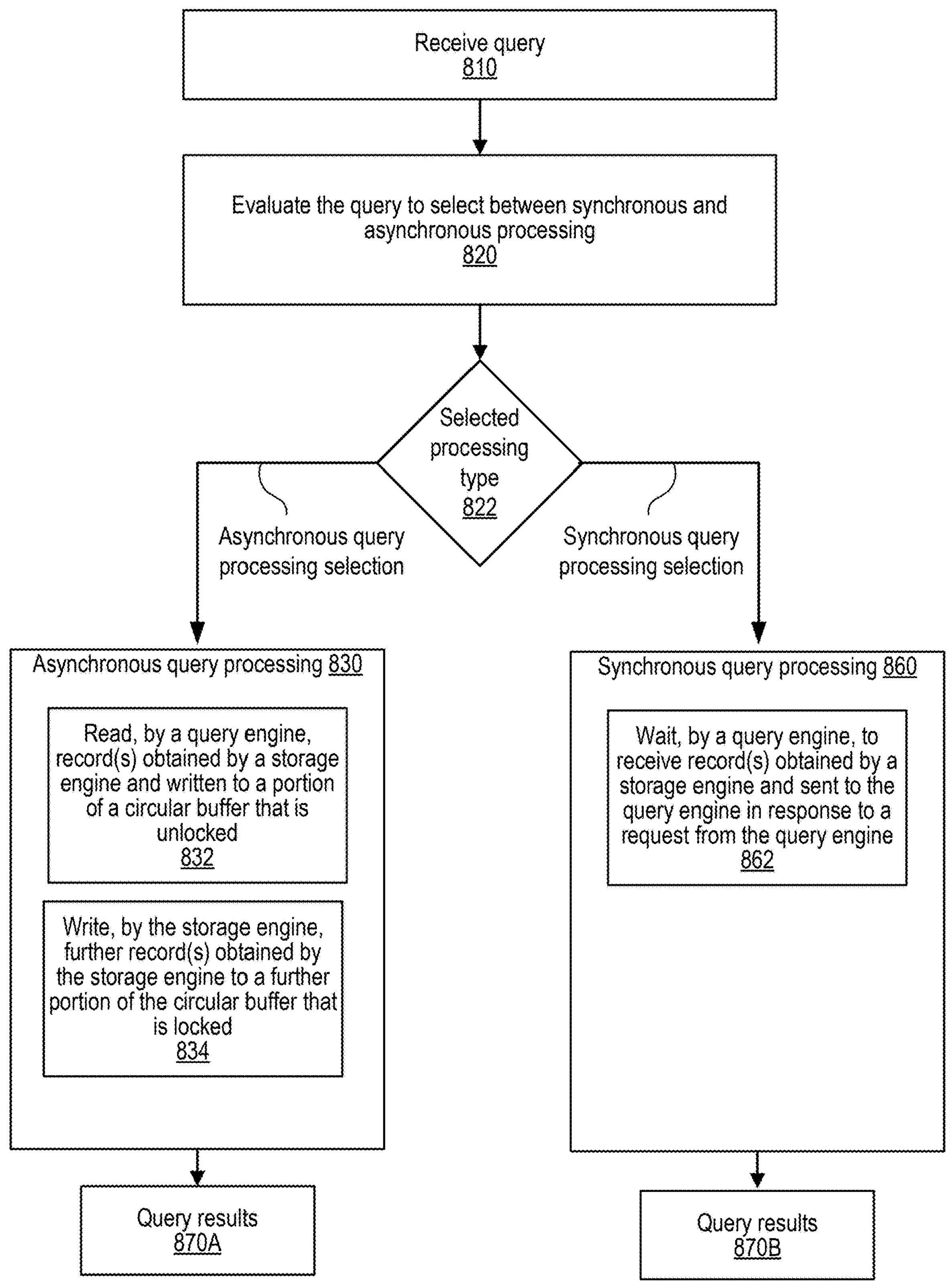
FIG. 8 is a high-level flowchart illustrating various methods and techniques for selecting asynchronous query processing or synchronous query processing for a query, according to some embodiments.

FIG. 8 is a high-level flowchart illustrating various methods and techniques for selecting performing asynchronous query processing or synchronous query processing for a query, according to some embodiments. Various different systems and devices may implement the various methods and techniques described below, either singly or working together. For example, a storage engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 810, a query directed to one or more databases may be received, in some embodiments. For example, a query engine (e.g., query engine 130 of FIGS. 1-2, etc.) may receive the query directed to the one or more databases. A query plan to perform the query may be generated, and based on the plan to perform the query, as indicated at 820, an evaluation of the query may be performed to select a type of processing to perform the query, between asynchronous query processing and synchronous query processing. The selection for processing type, as indicated at 822, may be based at least on one or more analyses performed with respect to the query itself and/or a system implementing the query engine (as discussed above with regard FIG. 2), where the different analysis results may be applied with respect to different criteria, rules, or other heuristics to determine if the query may be optimally performed with asynchronous query processing. For example, a performance benefit may be estimated for performing the query with asynchronous query processing by estimating performance of the query both with asynchronous query processing and synchronous query processing to compare and determine a performance benefit (if any) for using asynchronous query processing.

In some embodiments, as indicated at 830, asynchronous query processing may be selected for performing the query. A query engine and a storage engine may perform various steps and techniques simultaneously, and as described below, to perform the query utilizing asynchronous query processing. For example, a query engine may read record(s) obtained by a storage engine and written to a portion of a circular buffer that is unlocked, as indicated at 832. In parallel or in overlapping fashion, the storage engine may write further record(s) obtained by the storage engine to a further portion of the circular buffer that is locked so that the query engine does not access the locked portion of the circular buffer.

In other embodiments, as indicated by synchronous query processing 860, the plan to perform the query may be selected to be processed utilizing synchronous query processing. As indicated at 862, as part of synchronous query processing, the query engine may wait to receive records obtained by a storage engine and sent in response to a request from the query engine. This may incur one or more wait periods (which may not be experienced by the query engine if asynchronous processing were performed). However, for some queries, synchronous query processing may be more beneficial or the only type of processing supported, as discussed above.

According to some embodiments, the query results 870A and 870B may be the same, with an exception of the query results being generated utilizing asynchronous query processing and synchronous query performance. Generating the query results 870A may require less time than to generate the query results 870B by reducing waiting time for the query engine and the storage engine, in some scenarios. For example, synchronous query processing 860, may have a waiting time after sending the request for record(s) to the storage engine, while the storage engine is obtaining requested records. Similarly, the storage engine may have a wait time while the query engine processes requested records. In comparison, asynchronous query processing may allow for the query engine to continuously read and process records obtained from a circular buffer that are obtained while the storage engine is still obtaining further requested records.

Figure 9:
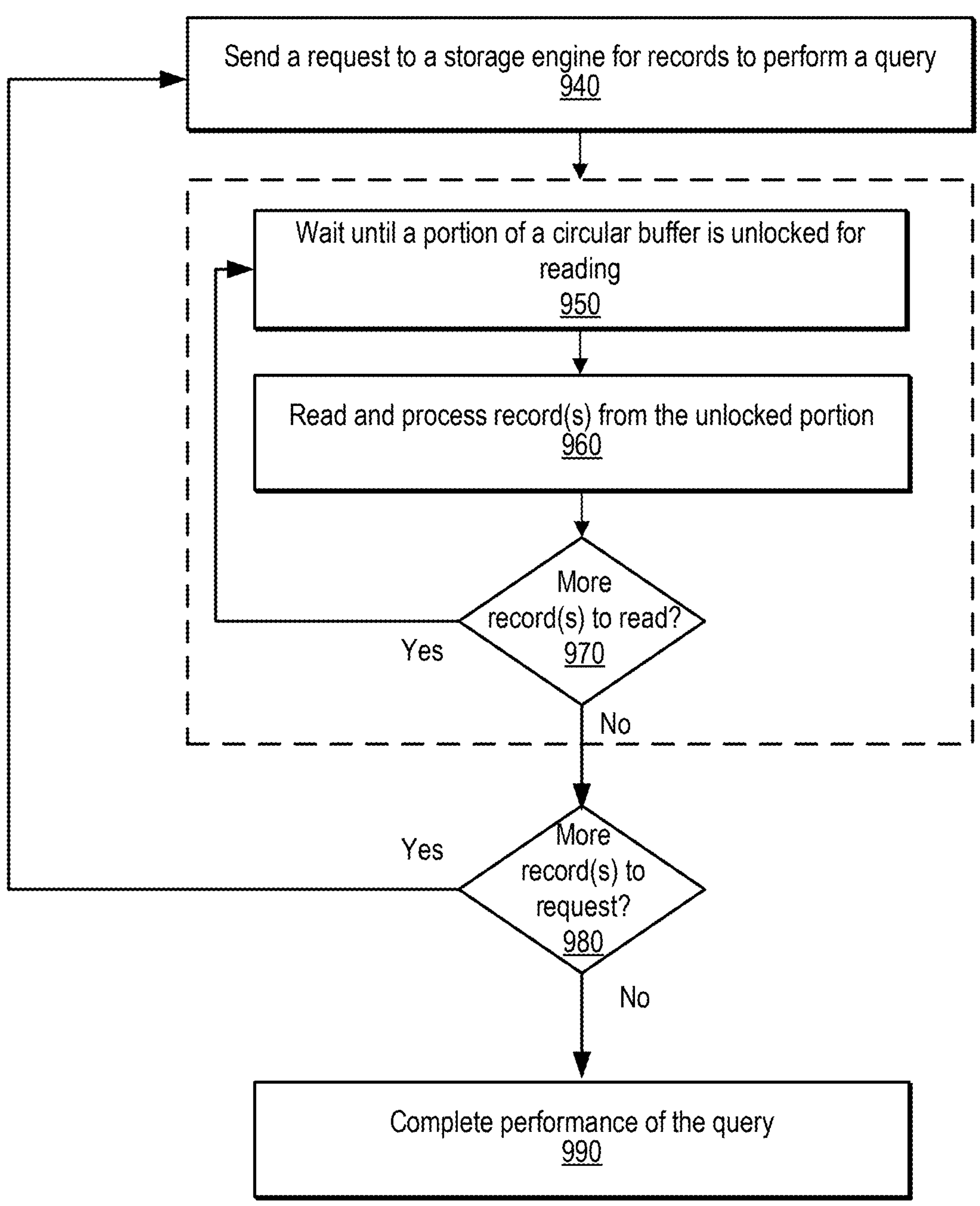
FIG. 9 is a high-level flowchart illustrating methods and techniques for performing a query utilizing asynchronous query processing utilizing a circular buffer, according to some embodiments.

FIG. 9 is a high-level flowchart illustrating methods and techniques for performing a query utilizing asynchronous query processing utilizing a circular buffer, according to some embodiments. Various different systems and devices may implement the various methods and techniques described below, either singly or working together. For example, a database engine head node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As discussed above, query to be performed from one or more databases may be received, according to some embodiments. For example, the request may be from a client (e.g., client(s) 350 from FIG. 3, etc.). An evaluation may be performed to select asynchronous query processing for the query. As indicated at 940, a request may be sent by a query engine to a storage engine (e.g., storage engine 140 of FIGS. 1-2, etc.) for record(s), in some embodiments. As indicated at 950, a query engine may wait until a portion of a circular buffer is unlocked for reading, where the readable portion of the circular buffer may contain one or more of the record(s) requested from the storage engine. As indicated at 960, the unlocked portion may be read to obtain record(s) and process them for performing the query. As indicated at 970, if more records remain to be read, then the query engine may wait until another portion is unlocked for reading, as indicated by the positive exit from 970. If not, then a determination may be made as to whether there are further records to request, as indicated at 980. If not, then as indicated at 990, performance of the query may be completed.

According to some embodiments, more than one request for records may be sent to the storage engine (e.g., as illustrated at 940) based on record(s) required to perform the query. For example, a query may be divided into different subqueries as part of generating a query plan. In some embodiments, each subquery may have its own request for records, thus a query may have more than one request (as indicated at 980). However, in some embodiments, all records for a query may be requested at 940, therefore after no more records remain to be read from a circular buffer then performance of a query may be completed, as indicated at 990.

Figure 10:
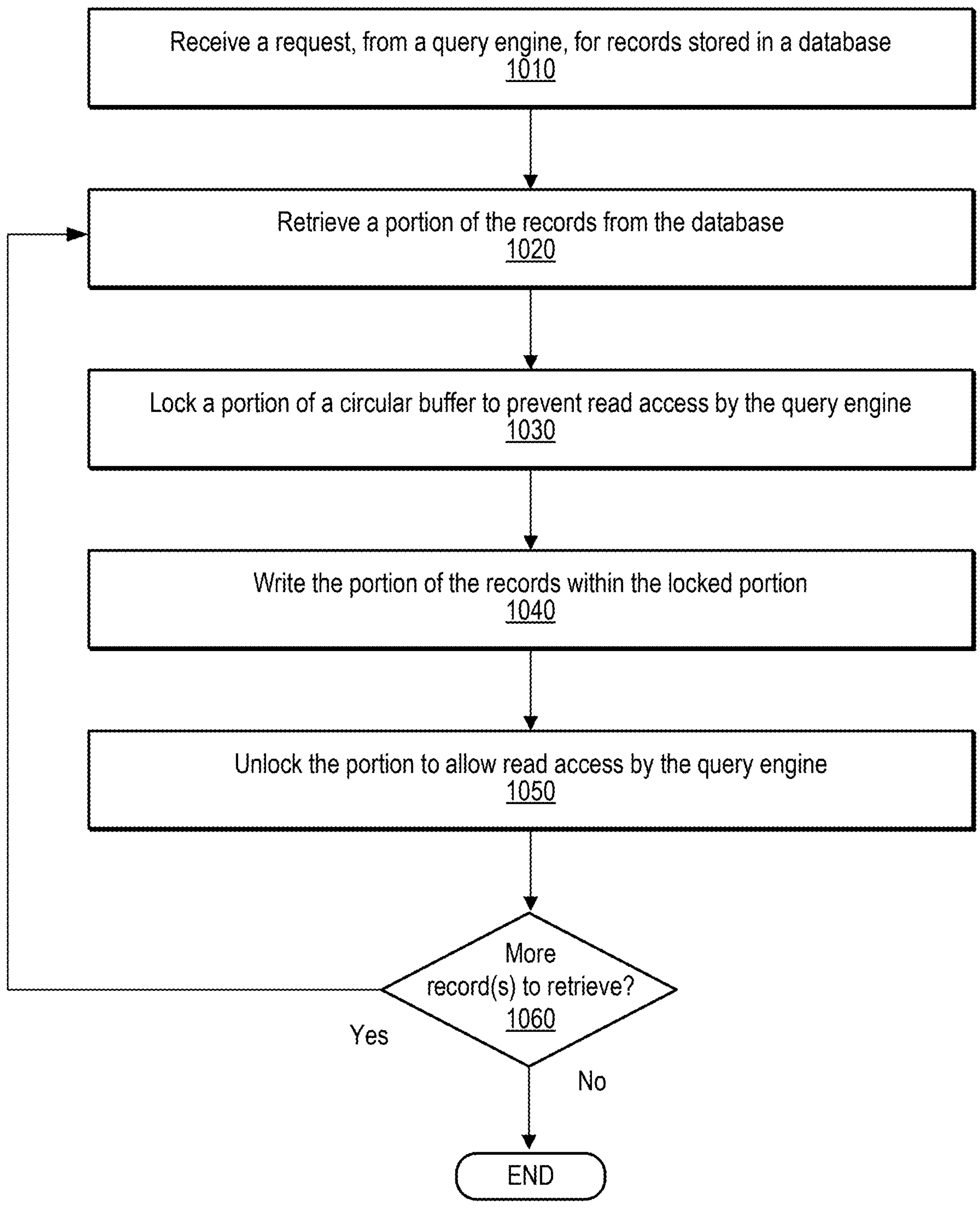
FIG. 10 is a high-level flowchart illustrating various methods and techniques for receiving requests for records and writing records to a writeable portion of a circular buffer based on the received requests for records, according to some embodiments.

FIG. 10 is a high-level flowchart illustrating various methods and techniques for receiving requests for records and writing records to a writeable portion of a circular buffer based on the received requests for records, according to some embodiments. Various different systems and devices may implement the various methods and techniques described below, either singly or working together. For example, a database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 1010, a request for records may be received at a storage engine (e.g., may be received utilizing APIs such as 421-429 described above with regard to FIG. 4, etc.) from a query engine (e.g., query engine 130 of FIGS. 1-2, etc.), according to some embodiments. As indicated at 1020, based on the received request for records, a portion of the records may be retrieved. In some embodiments, more than a single database may be accessed to retrieve the records, according to the received request for records. As indicated at 1030, a portion of a circular buffer (e.g., circular buffer 150 of FIGS. 1-2, etc.) may be locked to prevent read access by a query engine. As indicated at 1040, the retrieved record(s) may be written within the locked portion of the circular buffer. As indicated at 1050, the portion of the circular buffer may be unlocked to allow read access by the query engine. As indicated at 1060, if more records remain to be retrieved, then the process may be repeated, as indicated by the positive exit from 1060. If not, then obtaining records may be complete for the query.

The methods described herein may in various embodiments be implemented by any combination of hardware and software. For example, in some embodiments, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 11:
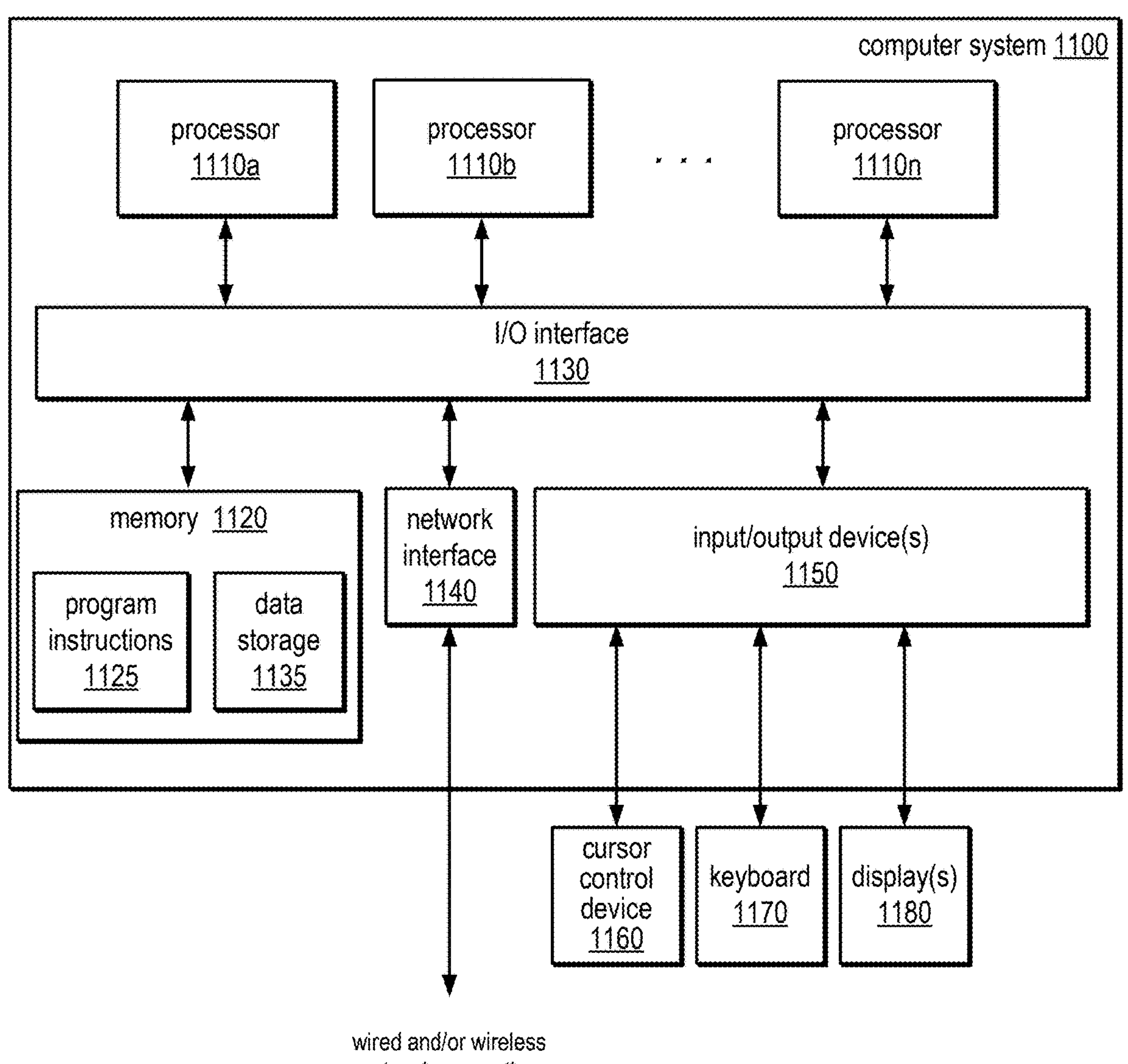
FIG. 11 is a block diagram illustrating an example computing system that may implement at least a portion of systems described herein, according to some embodiments.

Embodiments to implement a asynchronous query processing using a circular buffer as described herein may be executed on one or more computer systems, which may interact with various other devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1100, while in other embodiments multiple such systems, or multiple nodes making up computer system 1100, may host different portions or instances of embodiments. For example, in some embodiments some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions, in some embodiments. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1120 may store program instructions 1125 and/or data accessible by processor 1110 to implement a lightweight filesystem for remote storage caching, in some embodiments. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to perform offline builds for projected data subsets are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. A computer-accessible medium may include non-transitory storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140, in some embodiments.

In some embodiments, I/O interface 1130 may be coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may allow data to be exchanged between computer system 1100 and other devices attached to a network, such as other computer systems, or between nodes of computer system 1100, in some embodiments. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100, in some embodiments. Multiple input/output devices 1150 may be present in computer system 1100 or may be distributed on various nodes of computer system 1100, in some embodiments. In some embodiments, similar input/output devices may be separate from computer system 1100 and may interact with one or more nodes of computer system 1100 through a wired or wireless connection, such as over network interface 1140.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a database system, wherein the database system comprises a database management system and a storage engine, wherein the database system is configured to:

receive a query;

select asynchronous query processing instead of synchronous query processing for the query based, at least in part, on an analysis of a plan generated to perform the query, wherein both synchronous query processing and asynchronous query processing are supported for performing queries at the database system; and perform the query using the selected asynchronous query processing, wherein to perform the query, the database system is configured to:

send a request, utilizing one or more execution threads of the database management system, to the storage engine for a plurality of records to perform the query according to the plan;

obtain, by one or more threads of the storage engine, one or more records of the plurality of records;

write, by the one or more threads of the storage engine, the one or more records to a first portion of a circular buffer, wherein the first portion of the circular buffer is locked for read access by the one or more execution threads until the storage engine is finished writing to the first portion of the circular buffer;

determine, by the one or more execution threads, that the first portion of the circular buffer is unlocked;

read, by the one or more execution threads, the one or more records from the first portion of the circular buffer, wherein the storage engine is writing a further one or more records of the plurality of records to a second portion of the circular buffer that is locked for reading by the one or more execution threads while the one or more execution threads are reading the one or more threads from the first portion of the circular buffer;

return a result of the query, based at least in part, on the plurality of records.

2. The system as recited in claim 1, wherein to select asynchronous query processing for the query, the database system is configured to determine a type of the query that indicates that the query can be processed using asynchronous query processing.

3. The system as recited in claim 1, wherein to select asynchronous query processing for the query, the database system is configured to evaluate resource utilization for a query engine to determine that the query engine supports utilizing the asynchronous query processing for the query.

4. The system as recited in claim 1, wherein to select asynchronous query processing for the query, the database system is configured to determine a performance benefit from processing the query utilizing asynchronous query processing when compared to synchronous query processing for the query.

5. The system as recited in claim 1, wherein the circular buffer comprises more than two portions.

6. A method, comprising:

receiving a query directed to a database;

selecting, by a query engine for a database, between synchronous processing and asynchronous processing, based, at least in part, on an evaluation of a plan to perform the query, wherein the query engine selects asynchronous processing for the query, and wherein both synchronous query processing and asynchronous query processing are supported for performing queries at the database;

performing the query, by the query engine using asynchronous processing, comprising:

requesting, by the query engine, a plurality of records to perform the query from a storage engine for the database;

obtaining, by the storage engine, one or more records of the plurality of records;

storing, by the storage engine, the one or more records to a first portion of a circular buffer, wherein the first portion of the circular buffer is locked for read access by the query engine until the storage engine is finished writing to the first portion of the circular buffer;

determining, by the query engine, that the first portion of the circular buffer is unlocked; and reading, by the query engine, the one or more records from the first portion of the circular buffer, wherein the storage engine is writing a further one or more records of the plurality of records to a second portion of the circular buffer that is locked for reading by the query engine while the query engine is reading from the first portion of the circular buffer.

7. The method as recited in claim 6, wherein selecting asynchronous query processing for the query, comprises determining a type of the query that indicates that the query can be processed using asynchronous query processing.

8. The method as recited in claim 6, wherein selecting asynchronous query processing for the query comprises evaluating resource utilization for the query engine to determine that the query engine supports utilizing the asynchronous query processing for the query.

9. The method as recited in claim 6, wherein selecting asynchronous query processing for the query, comprises determining a performance benefit from processing the query utilizing asynchronous query processing when compared to utilizing synchronous query processing for the query.

10. The method as recited in claim 6, wherein the circular buffer comprises more than two portions.

11. The method as recited in claim 6, wherein the query engine uses a first one or more threads to request the plurality of records and read from the first portion of the circular buffer and wherein the storage engine uses a second or more threads to obtain the plurality of records and store the one or more records to the first portion of the circular buffer.

12. The method as recited in claim 6, wherein selecting asynchronous query processing is performed as part of applying one or more optimization rules to the plan generated to perform the query.

13. The method as recited in claim 11, wherein another query is received that is performed by the query engine using synchronous processing, wherein the query engine waits to receive one or more other records obtained by the storage engine in a response to a request for the one or more other records sent by the query engine to the storage engine.

14. One or more non-transitory computer-accessible storage media storing program instructions that when executed on or across one or more processors:

receiving a query directed to a database;

selecting, by a query engine for the database, between synchronous processing and asynchronous processing, based, at least in part, on an evaluation of a plan to perform the query, wherein the query engine selects asynchronous processing for the query, and wherein both synchronous query processing and asynchronous query processing are supported for performing queries at the database;

performing the query, by the query engine using asynchronous processing, comprising:

requesting, by the query engine, a plurality of records to perform the query from a storage engine for the database;

determining, by the query engine, that the storage engine has stored one or more records of the plurality of records to a first portion of a circular buffer and that the storage engine has unlocked the first portion of the circular buffer for read access by the query engine after finishing writing to the first portion of the circular buffer; and reading, by the query engine, the one or more records from the first portion of the circular buffer, wherein the storage engine is writing a further one or more records of the plurality of records to a second portion of the circular buffer that is locked for reading by the query engine while the query engine is reading from the first portion of the circular buffer.

15. The one or more non-transitory computer-accessible storage media as recited in claim 14, wherein, in selecting asynchronous query processing for the query, the program instructions cause the one or more processors to implement determining a type of the query that indicates that the query can be processing using asynchronous query processing.

16. The one or more non-transitory computer-accessible storage media as recited in claim 14, wherein, in selecting asynchronous query processing for the query, to the program instructions cause the one or more processors to implement evaluating resource utilization for the query engine to determine that the query engine supports utilizing the asynchronous query processing for the query.

17. The one or more non-transitory computer-accessible storage media as recited in claim 14, wherein, in selecting asynchronous query processing for the query, the program instructions cause the one or more processors to implement determining a performance benefit from processing the query utilizing asynchronous query processing when compared to utilizing synchronous query processing for the query.

18. The one or more non-transitory computer-accessible storage media as recited in 15, wherein the circular buffer comprises more than two portions.

19. The one or more non-transitory computer-accessible storage media as recited in claim 14, wherein selecting asynchronous query processing is performed as part of applying one or more optimization rules to the plan generated to perform the query.

20. The one or more non-transitory computer-accessible storage media as recited in claim 14, wherein another query is received that is performed by the query engine using the synchronous processing, wherein the query engine waits to receive one or more other records obtained by the storage engine in a response to a request for the one or more other records sent by the query engine to the storage engine.

* * * * *